US008782765B2

(12) United States Patent
Kranendonk et al.

(10) Patent No.: US 8,782,765 B2
(45) Date of Patent: *Jul. 15, 2014

(54) TECHNIQUES FOR ENVIRONMENT SINGLE SIGN ON

(75) Inventors: Nathaniel Kranendonk, Springville, UT (US); Stephen R Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/616,079

(22) Filed: Sep. 14, 2012

(65) Prior Publication Data

US 2013/0014244 A1 Jan. 10, 2013

Related U.S. Application Data

(63) Continuation of application No. 12/534,249, filed on Aug. 3, 2009, now Pat. No. 8,281,381.

(51) Int. Cl.
*G06F 21/00* (2013.01)

(52) U.S. Cl.
USPC ............................................................ 726/8

(58) Field of Classification Search
USPC ................................................................ 726/8
See application file for complete search history.

(56) References Cited

U.S. PATENT DOCUMENTS

| 7,299,493 | B1 * | 11/2007 | Burch et al. ...................... 726/5 |
| 7,353,383 | B2 * | 4/2008 | Skingle ......................... 713/156 |
| 7,412,720 | B1 * | 8/2008 | Frey et al. ......................... 726/8 |
| 7,546,373 | B2 * | 6/2009 | Lehew et al. ................... 709/229 |
| 8,281,381 | B2 * | 10/2012 | Kranendonk et al. ............. 726/8 |
| 2004/0128393 | A1 * | 7/2004 | Blakley et al. ................. 709/229 |
| 2004/0210771 | A1 * | 10/2004 | Wood et al. .................... 713/201 |
| 2004/0221309 | A1 * | 11/2004 | Zaner et al. ...................... 725/46 |
| 2005/0171872 | A1 * | 8/2005 | Burch et al. ...................... 705/29 |
| 2006/0080730 | A1 * | 4/2006 | Cahill et al. ....................... 726/8 |
| 2006/0242405 | A1 * | 10/2006 | Gupta et al. .................... 713/156 |
| 2007/0283424 | A1 * | 12/2007 | Kinser et al. ...................... 726/5 |
| 2007/0294752 | A1 * | 12/2007 | Kinser et al. ...................... 726/8 |
| 2008/0086770 | A1 * | 4/2008 | Kulkarni et al. ................ 726/20 |
| 2008/0235779 | A1 * | 9/2008 | Bogner ............................. 726/8 |
| 2008/0276308 | A1 * | 11/2008 | Graser et al. ...................... 726/6 |
| 2009/0007248 | A1 * | 1/2009 | Kovaleski ......................... 726/8 |
| 2009/0119763 | A1 * | 5/2009 | Park et al. ......................... 726/8 |
| 2009/0126000 | A1 * | 5/2009 | Andreev et al. ................... 726/8 |
| 2009/0172795 | A1 | 7/2009 | Ritari et al. |
| 2009/0198804 | A1 * | 8/2009 | Danforth et al. .............. 709/221 |
| 2011/0030044 | A1 | 2/2011 | Kranendonk et al. |
| 2011/0098043 | A1 * | 4/2011 | Yu et al. ....................... 455/435.1 |

* cited by examiner

*Primary Examiner* — Kambiz Zand
*Assistant Examiner* — Aubrey Wyszynski
(74) *Attorney, Agent, or Firm* — Schwegman, Lundberg & Woessner, P.A.

(57) ABSTRACT

Techniques for environment single sign on are provided. Multiple identifiers for devices are associated as a single environment. A principal can be authenticated via any of the devices once to access protected resources and once authenticated the principal can access the protected resources from the other devices without re-authenticating.

20 Claims, 4 Drawing Sheets

TECHNIQUES FOR ENVIRONMENT SINGLE SIGN ON

RELATED APPLICATIONS

The present application, claims priority to, and is a Continuation of U.S. patent application Ser. No. 12/534,249, filed Aug. 3, 2009 now issued as U.S. Pat. No, 8,281,381, the disclosure of which is incorporated by reference in its entirety herein and below.

BACKGROUND

Today, nearly every type of communication and transaction occurs and takes place over the Internet and the World-Wide Web (WWW). For example, businesses transact via the Internet to securely connect with back-end assets and individuals communicate via the Internet to social networking sites.

Each system or machine that a user connects to and that is secure typically requires some form of user authentication. Single sign-on capabilities are a great way to access back-end protected assets with one user authentication transaction.

The problem is that single sign-on capabilities are limited to a particular machine. That is, single sign-on features permit a user to sign on once to access assets controlled by one machine. However, with existing technologies a user cannot achieve single sign on to access assets that are controlled by multiple different machines.

Thus what are needed are improved techniques for single sign on.

SUMMARY

In various embodiments, techniques for environment single sign on are presented. More specifically, and in an embodiment, a method for environment single sign on is provided. A request is received from a principal on a first device for purposes of accessing a first protected resource. The principal is initially authenticated for access to the first protected resource. Next, a first authentication session for the first device and a second authenticated session for a second device are established for the principal. The first and second device comprise an environment with one another and the principal is permitted to access the first protected resource and one or more second protected resources that are also part of the environment. Access is permitted from the first device and from the second device without re-authentication.

DETAILED DESCRIPTION

Figure 1:
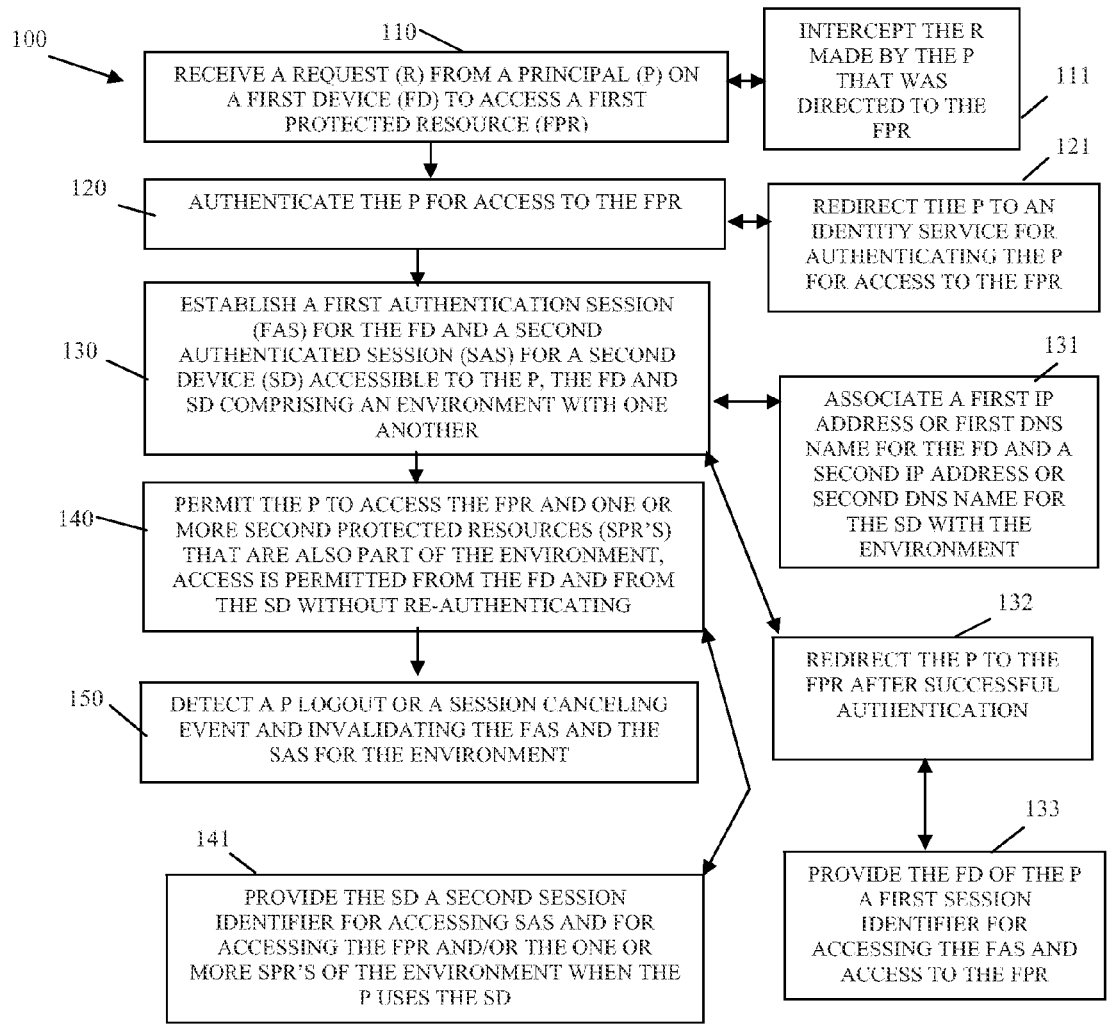
FIG. 1 is a diagram of a method for environment single sign on, according to an example embodiment.

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, thee scan, etc.

A "semantic identity" is a special type of identity that a principal can assume. Automated resources, such as services, may process the semantic identity over a network on behalf of the agent to which the semantic identity is associated. The semantic identity is confined or circumscribed to defined categories and interests identified by the principal. That is, the services that process the semantic identity over a network operate within a circumscribed semantic space of that network, where the semantic space is defined by the categories and the interests of the semantic identity.

In an embodiment, the true persona of the principal and the other identities of the principal, including the semantic identity, may be created and managed by an identity service. Examples of some identity services, which may be modified with the teachings presented herein, may be found in U.S. Ser. No. 10/765,523, entitled "Techniques for Dynamically Establishing and Managing Authentication and Trust Relationships," filed Jan. 27, 2004; U.S. Ser. No. 10/767,884, entitled "Techniques for Establishing and Managing a Distributed Credential Store," filed Jan. 29, 2004; and U.S. Ser. No. 10/770,677, entitled "Techniques for Dynamically Establishing and Managing Trust Relationships," filed on Feb. 3, 2004. The disclosures of which are incorporated by reference herein.

Various embodiments of this invention can be implemented in existing network architectures. For example, in some embodiments, the techniques presented herein are implemented in whole or in part in the Novelle® network and proxy server products, distributed by Novelle®, Inc., of Provo, Utah.

Also, the techniques presented herein are implemented in machines, such as processor or processor-enabled devices. These machines are configured to specifically perform the processing of the methods and systems presented herein. Moreover, the methods and systems are implemented in computer-readable storage media and processed on the machines configured to perform the methods.

Of course, the embodiments of the invention can be implemented in a variety of architectural platforms, operating and server systems, or applications, Any particular architectural layout or implementation presented herein is provided for purposes of illustration and comprehension only and is not intended to limit aspects of the invention.

Figure 4:
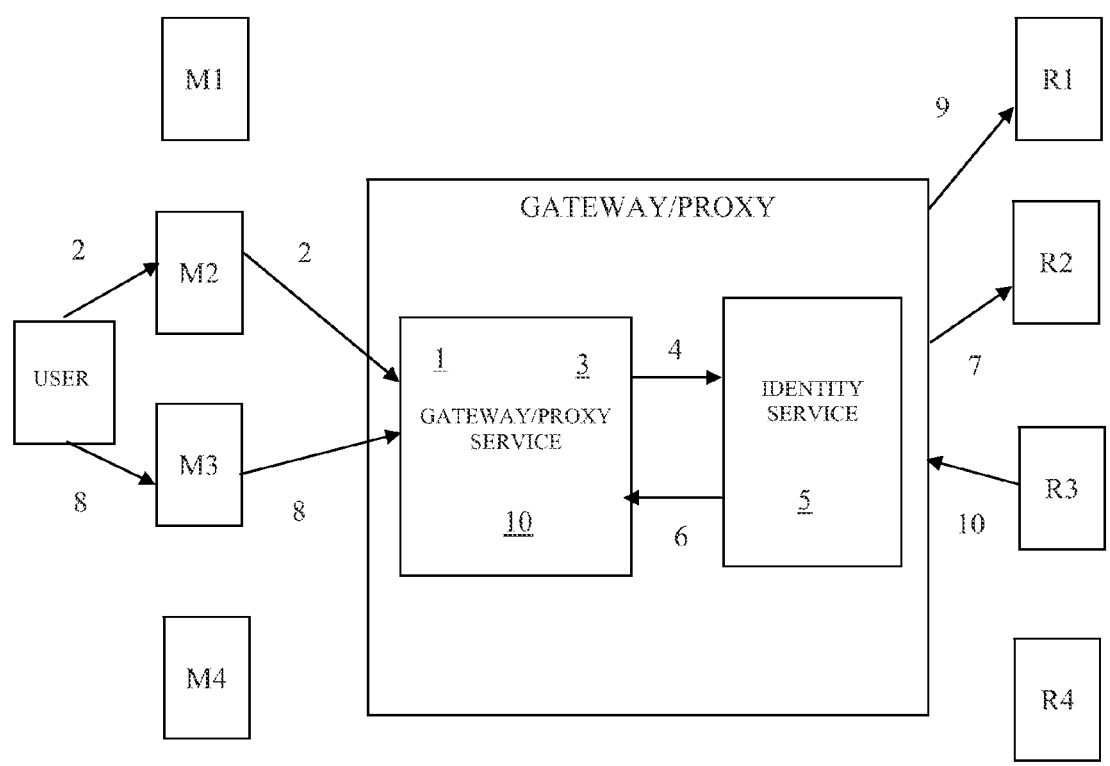
FIG. 4 is an example architecture and component interaction diagram for an environmental single sign on system.

It is within this context that embodiments of the invention are now discussed within the context of FIG. 1C4.

FIG. 1 is a diagram of a method 100 for environment single sign on, according to an example embodiment. The method 100 (hereinafter "environmental single sign-on service") is implemented in a machine-accessible and computer-readable medium and instructions that execute on a processor (machine, computer, processor, etc.). The machine is specifically configured to process the education environmental single sign-on service. Furthermore, the environmental single sign-on service is operational over and processes within a network. The network may be wired, wireless, or a combination of wired and wireless.

In an embodiment, the environmental single sign-on service executes on a proxy device or a gateway device.

At 110, the environmental single sign-on service receives a request from a principal on a first device (first client) to access a protected resource. A protected resource is one that is controlled within a secure environment. A secure environment is one in which some form of authentication is required to access that secure environment.

According to an embodiment, at 111, the environmental single sign-on service intercepts the request by the principal that was directed by the principal to the first protected resource. Here, the device that processes the environmental single sign-on service can be either a transparent or a reverse proxy.

In another case, the first device of the principal is preconfigured to directly communicate with device that processes the environmental single sign-on service, so the device of the environmental single sign-on service can be viewed as a forward proxy.

At 120, the environmental single sign-on service authenticates the principal for access to the first protected resource. Authentication can occur via a variety of mechanisms. This is also a first and initial interaction that the principal has for requesting the first protected resource or other protected resources controlled by the environmental single sign-on service. By first and initial it is meant that the principal is making a request for the first protected resource for a very first time or for a first time after a prior successful authenticated session was terminated for any reason. It is noted that the principal does not have to re-authenticate if an existing authenticated session is still valid and the principal is attempting to access the first protected resource or another protected resource via the first device or other devices that are recognized as part of a secure environment (discussed in greater detail below).

In a particular authentication case, at 121, the environmental single sign-on service redirects the principal to an identity service. The identity service provides the authentication services for the environmental single sign-on service and decides whether the principal is to be granted access to the first protected resource.

At 130, the environmental single sign-on service establishes a first authentication session for the first device and a second authentication session for a second and different device. The second and different device is also accessible to or available to the principal. The first device and the second device combine to form an environment that is managed by the environmental single sign-on service for single sign-on.

According to an embodiment, the first and second devices can be packaged together as a set of virtual machines to form the environment.

In one situation, at 131, the environmental single sign-on service associates a first Internet Protocol (IP) address and/or a first Domain Name System (DNS) name for the second device with the environment.

In another scenario, at 132, the environmental single sign-on service redirects the principal to the first protected resource after the principal has been successfully authenticated to the environment via the first device.

Continuing with the embodiment of 132 and at 133, the environmental single sign-on service provides the first device of the principal with a first session identifier for access the first authentication session and access to the first protected resource.

At 140, the environmental single sign-on service permits the principal to access the first protected resource and one or more additional and second protected resources controlled by the environmental single sign-on service. The one or more additional protected resources are also part of the environment. Moreover, access is permitted from the first device and from the second device without requiring the principal to re-authenticate when the principal attempts to access any of the protected resources via the second device. Conventionally, such a situation was not possible because single sign on was tied to a particular device that a user performed authentication on such that if the principal accessed a different device, the principal was required to authenticated another time.

According to an embodiment, at 141, the environmental single sign-on service provides the second device a second session identifier for accessing the second authenticated session and for accessing the first protected resource and/or the one or more second protected resources of the environment when the principal uses the second device.

In an embodiment, at 150, the environmental single sign-on service detects when the principal logs out of either the first authenticated session or the second authenticated session and/or the environmental single sign-on service detects when one of the authenticated sessions terminates abnormally or normally (a session canceling event). When such a situation is detected, the environmental single sign-on service invalidates both the first authenticated session and the second authenticated session; thereby forcing the principal to perform authentication and a new single sign on when the principal subsequently attempts to access the first protected resource or the second protected resources from either the first device or the second device.

It is noted that for purposes of illustration, the single environmental sign on was described in terms of two devices (first and second devices); however, it is noted that the embodiments of the invention are not limited to any particular number of machines (devices). Therefore, three or more or N (N is an Integer greater than 2) number of machines can comprise the environment. Furthermore, although the embodiments are not so limited, project development lifecycle environments (test, production, etc.) are situations where a principal would want to access multiple protected resources from multiple machines.

Figure 2:
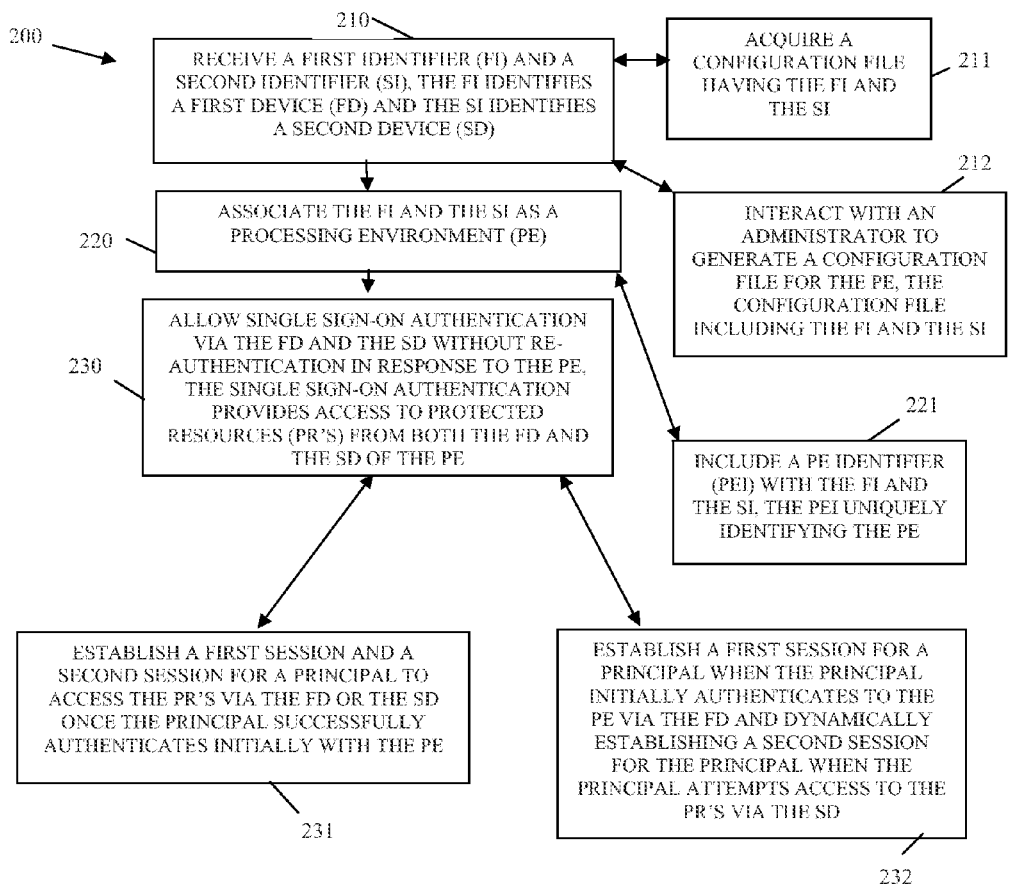
FIG. 2 is a diagram of another method for environment single sign on, according to an example embodiment.

FIG. 2 is a diagram of another method 200 for environment single sign on, according to an example embodiment. The method 200 (hereinafter "single sign-on service" is implemented in a machine-accessible and computer-readable storage medium as instructions that execute on a processor and that is operational over a network. The processor is specifically configured to process the single sign-on service. Furthermore, the network may be wired, wireless, or a combination of wired and wireless.

The single sign-on service provides another and in some cases enhanced perspective of the environmental single sign-on service represented by the method 100 of the FIG. 1, discussed above. Moreover, the single sign-on service provides a processing prospective on how an environment is initially established and managed by the environmental single sign-on service represented by the method 100 of the FIG. 1.

At 210, the single sign-on service receives a first identifier and second identifier. The first identifier identifies a first device (first machine) and the second identifier identifies a second device (second machine). Some example identifiers for devices were provided above with respect to the method 100 of the FIG. 1, such as IP addresses and/or DNS names.

According to an embodiment, at 211, the single sign-on service acquires a configuration file having the first identifier and the second identifier. The configuration file is for an environment that the single sign-on service is creating and managing for single sign on. Moreover, the configuration file can include other information, such as an environment identifier, operating system versions, certificates, signatures, available resource identifiers, access policies, authentication mechanisms to be used or required of requesting principals that want to access the environment, etc.

In an embodiment, at 212, the single sign-on service interacts with an administrator (type of principal) to generate a configuration file (discussed above with reference to the embodiment at 211) for the processing environment, Again, the configuration file includes the first and second identifiers.

At 220, the single sign-on service associates the first identifier and the second identifier as a processing environment. That is, a relationship between the first and second devices is established via, the identifiers. This relationship can be stored in storage and/or memory and managed by the single sign-on service.

In a scenario, at 221, the single sign-on service includes a processing environment identifier with the first identifier and the second identifier. The processing environment identifier uniquely identifies the processing environment. So, the single sign-on service can actively and dynamically manage multiple processing environments for single sign on. Moreover, a single device can be included in multiple different processing environments. Policy can dictate the limits of device participation in processing environments.

At 230, the single sign-on service allows single sign on authentication via the first device and the second device without re-authentication. This is done in response to the information included or the relationship established by the processing environment. Further, the single sign-on authentication provides access to multiple protected resources from both the first device and the second device of the processing environment.

In one case, at 231, the single sign-on service establishes a first session and a second session for a principal to access the protected resources via the first device or the second device once the principal successfully authenticates initially with the processing environment.

In an alternative situation, at 232, the single sign-on service establishes a first session for a principal when the principal initially authenticates to the processing environment via a first device and dynamically establishes a second session for the principal just when the principal attempts to access one of the protected resources via the second device.

So, the embodiment at 231 automatically creates sessions on behalf of a principal for each device of the environment once the principal authenticates to the environment via any of the devices that comprise the environment. Conversely, the embodiment at 231 dynamically creates the sessions on behalf of the principal as the principal attempts to access the protected resources via particular machines (devices).

Figure 3:
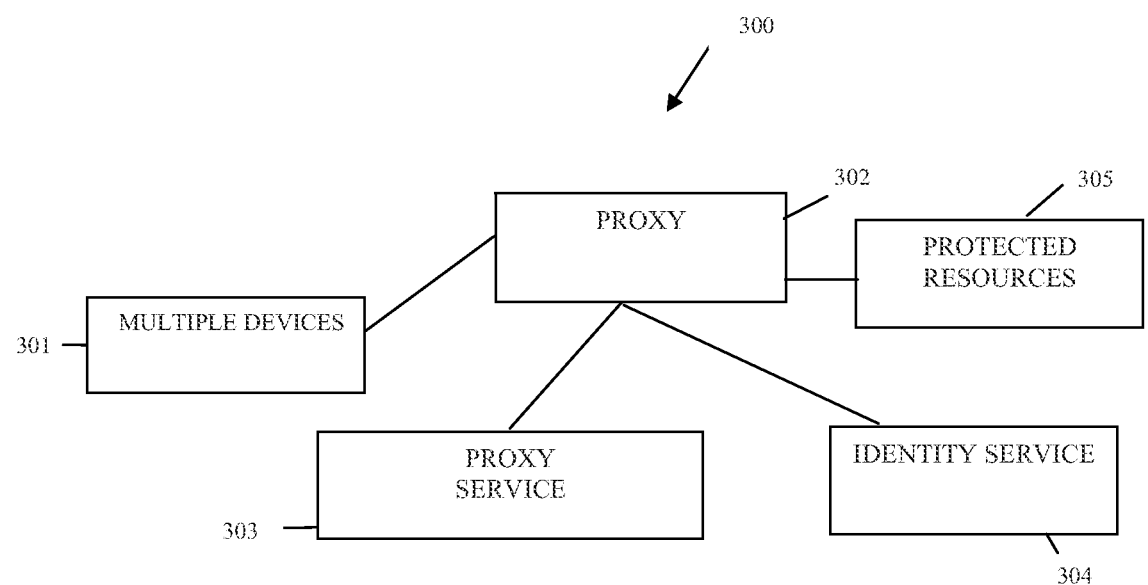
FIG. 3 is a diagram of an environmental single sign on system, according to an example embodiment.

FIG. 3 is a diagram of an environmental single sign on system 300, according to an example embodiment. The environmental single sign on system 300 is implemented in a machine-accessible and computer-readable storage medium as instructions that execute one or more processors (multiprocessor) and that is operational over a network. The one or more processors are specifically configured to process the components of the environmental single sign on system 300. Moreover, the network may be wired, wireless, or a combination of wired and wireless. In an embodiment, the environmental single sign on system 300 implements, among other things, the environmental single sign-on service and the single sign-on service represented by the methods 100 and 200 of the FIGS. 1 and 2, respectively.

The environmental single sign on system 300 includes a proxy device 302 and a proxy service 303. In an embodiment, the environmental single sign on system 300 also includes an identity service 304. Each of these will now be discussed in turn.

The proxy device 302 is a gateway, a forward proxy, a transparent proxy, or a reverse proxy. The proxy device 302 is interposed between multiple devices 301 that logically comprise an environment being managed for single sign on capabilities and controls access to protected resources 305. The proxy device 302 is the device or machine that the methods 100 and 200 of the FIGS. 1 and 2 are implemented on and executed on.

The proxy service 303 is implemented in a computer-readable medium and is to execute on the proxy device 302. Example features and processing associated with the proxy service 303 were presented above in detail with reference to the methods 100 and 200 of the FIGS. 1 and 2, respectively.

The proxy service 303 is configured to manage the multiple devices 301 as a single environment or logical entity. Furthermore, the proxy service 303 is configured to permit authentication to the multiple resources 301 of the single environment to occur once and without regard to which of the multiple devices 301 initial authentication occurs from.

According to an embodiment, the proxy service 303 is further configured to manage a configuration file for the single environment having IP address and/or DNS names for each of the multiple devices 301 and an environment identifier for the single environment.

In another embodiment, the proxy service 303 is also configured to establish multiple communication sessions between each of the multiple devices 301 and the protected resources 305 once a first and initial authentication is achieved by a principal attempting access to the protected resources 305.

In one situation, the proxy service 301 is configured to selectively and dynamically establish communication sessions between each of the multiple devices 301 and the protected resources 305 as an authenticated principal attempts access to the protected resources 305 from each of the multiple devices 301.

In an alternative case, the proxy service 302 is configured to selectively and dynamically establish communication sessions between each of the multiple devices 301 and the protected resources 305 as an authenticated principal attempts access to the protected resources 305 from each of the multiple devices 301.

According to an embodiment, the system 300 also includes an identity service 304. The identity service 304 is implemented in a computer-readable medium and is to execute on a processor; the processor may be on the proxy 302 or another network device. Example identity services 304 were described and incorporated by reference above.

The identity service 304 is configured to interact with the proxy service 302 to authenticate principals for single sign on to the single environment.

FIG. 4 is an example architecture and component interaction diagram for an environmental single sign on system. The architecture can be used to implement the methods 100 and 200 of the FIGS. 1 and 2, respectively, and the system 300 of the FIG. 3. It is to be understood that the processing and example illustrations presented with FIG. 4 are one example implementation of the invention and that others are foreseeable and fall within the scope of the embodiments presented herein.

In an embodiment, the architecture is achieved via an enhancement to the Novell Access Manager® product, distributed by Novell, Inc. of Provo, Utah. It is understood that other enhancements to existing product offerings or new products can also implement the architecture presented with the FIG. 4.

Discussion of the FIG. 4 and its components are provided in the context of how single sign on for multiple machines can be added achieved.

In FIG. 4, a user has four machines in a test environment and four protected resources; but, it is noted that any number of machines or resources can be added, without departing from the teachings presented herein.

Initially, at (1) a configuration file is added to a gateway or proxy server; the configuration file contains specific information about the environment depicted in the FIG. 4. The configuration file can be manually generated beforehand and installed on the gateway/proxy or can be automatically and dynamically generated by a utility having a user interface. The configuration file includes either the Domain Name System (DNS) name or an Internet Protocol (IP) address for every machine in each environment along with an associated environment identification (ID). For this example, machines 1-4 are in the configuration file.

At 2, a user is currently on machine 2 (M2) and wants to access protected resource 2 (R2). A request for this resource is made through the gateway/proxy.

At 3, a service (such as what is provided above with respect to methods 100 and 200 of the FIGS. 1 and 2, respectively) on the gateway/proxy parses the configuration file and stores the parsed data within a file for local access on the gateway/proxy. The service on the gateway/proxy searches for an associated session, but there is no session since the user has not authenticated yet. The data from the configuration file is then searched for the IP address or DNS name of machine 2 (M2). If the IP address or DNS name of machine 2 (M2) is found then it is in an environment and a session needs to be created for each machine in that environment.

At 4, the service of the gateway/proxy redirects the user to authenticate through an Identity Service (such as the identity services described and incorporated by reference herein and above) and passes the list of IP addresses or DNS names associated with each machine in the environment.

At 5, the user enters authentication credentials. If the authentication is accepted, then a session is created for each of the machines in the environment.

According to another embodiment, at 5, when a user accesses a protected resource from another machine a session could be created on the fly (dynamically and real time); so, sessions are only created when they are needed (as needed basis).

At 6, the session id's are passed back to the service of the gateway/proxy along with their associated IP addresses.

At 7, the user is redirected to protected resource 2 (R2) and now bias access to resources 1-4 (R1-R4).

At 8, the user wants to access protected resource 1 (R1) from machine 3 (M3). A request for this resource is made through the gateway/proxy. The service of the gateway/proxy finds that there is already a live session associated with the IP address or DNS name for machine 3 (M3) and grants access to the protected resource.

At 9, the User is redirected to protected resource 1 (R1) and now has access to all resources. This access is also granted if the user tries to access any protected resource from any machine in the environment.

At 10, as soon as a logout occurs from any protected resource the session associated with the IP address is invalidated. When a session is invalidated, a workflow on the gateway/proxy starts. In this workflow, the gateway finds that the invalidated session is associated with an IP address or DNS name in an environment and invalidates the sessions for all the machines in the environment.

One now fully appreciates how to achieve single sign on to an environment made up of several machines. In an embodiment, this is achieved by reading the DNS name or IP address of each machine in the environment from a configuration file and associating the IP address or DNS name with a live session.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method residing in non-transitory a computer-readable storage medium as executable instructions that are executed by a processor to perform the method, comprising:
    authenticating, via the processor, a principal for access to a protected resource;
    establishing, via the processor, a first session for the first device and a second session for a second device that is also accessible to the principal; and
    allowing, via the processor, the principal to access the protected resource and one or more other protected resources, without re-authenticating to the second device.

2. The method of claim 1, wherein authenticating further includes authenticating the principal after intercepting a request made by the principal for the protected resource.

3. The method of claim 1, wherein establishing further includes creating a processing environment for the first and second devices.

4. The method of claim 3, wherein creating further includes recognizing the first and second devices as virtual machines.

5. The method of claim 1, wherein allowing further includes using the first device as a proxy to the second device.

6. The method of claim 5, wherein using further includes recognizing the proxy as a forward proxy to the second device.

7. The method of claim 1, wherein allowing further includes providing the principal a first session identifier for accessing the first authenticated session and access to the first protected resource.

8. The method of claim 7, wherein providing further includes keeping a second session identifier for access the second authenticated session with the first device on behalf of the principal.

9. A method residing in non-transitory a computer-readable storage medium as executable instructions that are executed by a processor to perform the method, comprising:
- associating, by the processor, a processing environment comprising a first device and a second device; and
- allowing, by the processor, allowing single sign-on within the processing environment, the processing environment including protected resources associated with the first device and the second device.

10. The method of claim 9, wherein receiving further includes recognizing the processing environment as a virtual processing environment.

11. The method of claim 10, wherein recognizing further includes identifying the first device as a first virtual machine and the second device as a second virtual machine.

12. The method of claim 11, wherein identifying further includes packaging the first virtual machine and the second virtual machine as a set to form the virtual processing environment.

13. The method of claim 9 further comprising, using, via the processor, the first device as a proxy for access to the second device.

14. The method of claim 9, wherein allowing further includes establishing a first session when a user authenticates to the first device and automatically creating a second session for the user to access the second device.

15. A multiprocessor-implemented system, comprising:
- a device having memory and a processor; and
- a service implemented in a non-transitory computer-readable storage medium and to execute on the device;
- wherein the service is configured to form a single environment from multiple other devices and to permit single sign-on to multiple resources of the single environment to occur once.

16. The system of claim 15, wherein authentication for the single sign-on can occur on the device or any of the other devices.

17. The system of claim 15, wherein the device and the other devices are each an independent virtual machine.

18. The system of claim 15, wherein the service is configured to establish sessions between the device and the other devices for an authenticated principal using the single sign-on.

19. The system of claim 15, wherein the device is configured as a forward proxy to the other devices for the single sign-on.

20. The system of claim 15, wherein the service is configured to outsource initial authentication for the single sign-on to a third-party authentication service.

* * * * *